United States Patent
Matsumura et al.

(10) Patent No.: US 11,127,553 B1
(45) Date of Patent: Sep. 21, 2021

(54) OVERCURRENT CUTOFF UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nobuyuki Matsumura, Mie (JP); Shinichi Takase, Mie (JP); Hiroki Shimoda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 0 days.

(21) Appl. No.: 17/266,874

(22) PCT Filed: Aug. 21, 2019

(86) PCT No.: PCT/JP2019/032559
§ 371 (c)(1),
(2) Date: Feb. 8, 2021

(87) PCT Pub. No.: WO2020/045177
PCT Pub. Date: Mar. 5, 2020

(30) Foreign Application Priority Data

Aug. 29, 2018 (JP) .............................. JP2018-160015

(51) Int. Cl.
*H01H 85/08* (2006.01)
*H01H 85/06* (2006.01)
(Continued)

(52) U.S. Cl.
CPC ............ *H01H 85/08* (2013.01); *H01H 85/06* (2013.01); *H01H 85/143* (2013.01); *H01H 85/175* (2013.01); *H01R 4/185* (2013.01)

(58) Field of Classification Search
CPC ........ H01H 85/06; H01H 85/08; H01H 85/10; H01H 85/143; H01H 85/175; H01R 4/185
See application file for complete search history.

(56) References Cited

U.S. PATENT DOCUMENTS

| 5,304,740 A | * | 4/1994 | Bozell | .................... | H01B 3/441 |
| | | | | | 174/110 PM |
| 10,705,154 B2 | | 7/2020 | Kataoka et al. | | |

(Continued)

FOREIGN PATENT DOCUMENTS

| JP | 57-083050 | 5/1982 |
| JP | 57-084148 | 5/1982 |

(Continued)

OTHER PUBLICATIONS

Official Communication issued in International Bureau of WIPO Patent Application No. PCT/JP2019/032559, dated Sep. 24, 2019, along with an English translation thereof.

*Primary Examiner* — Jacob R Crum
(74) *Attorney, Agent, or Firm* — Greenblum & Bernstein, P.L.C.

(57) ABSTRACT

A voltage detection unit includes a wire in which a conductive core wire is coated with an insulating coating that is insulative, a terminal connection portion to be connected to an electrode terminal, a core wire connection portion of a connecting piece that is provided continuously with the terminal connection portion and connected to the core wire that is exposed from the insulating coating at a terminal of the wire, and a second coating holding portion that is provided side by side with the core wire connection portion in an extending direction of the wire and holds the insulating (Continued)

coating of the wire, and the wire arranged between the core wire connection portion and the second coating holding portion includes a fuse portion in which a diameter of the core wire is reduced in a state of being exposed from the insulating coating.

5 Claims, 12 Drawing Sheets

(51) Int. Cl.
*H01H 85/175* (2006.01)
*H01H 85/143* (2006.01)
*H01R 4/18* (2006.01)

(56) References Cited

U.S. PATENT DOCUMENTS

| | | | |
|---|---|---|---|
| 11,043,721 B2* | 6/2021 | Kataoka | H01M 50/502 |
| 2005/0116805 A1* | 6/2005 | Taga | H01H 85/044 |
| | | | 337/159 |
| 2005/0118857 A1* | 6/2005 | Saka | H01R 9/2458 |
| | | | 439/398 |
| 2011/0048762 A1* | 3/2011 | Sawamura | H01R 4/72 |
| | | | 174/78 |
| 2017/0025769 A1* | 1/2017 | Tokunaga | H01R 4/188 |
| 2017/0169919 A1* | 6/2017 | Wakabayashi | H01B 7/0045 |
| 2017/0278663 A1* | 9/2017 | Yoneda | H01H 85/06 |
| 2018/0047539 A1* | 2/2018 | Kang | H01H 85/048 |
| 2018/0358602 A1* | 12/2018 | Fukushima | H01M 50/20 |
| 2019/0229437 A1* | 7/2019 | Onuma | C22C 21/00 |

FOREIGN PATENT DOCUMENTS

| | | |
|---|---|---|
| JP | 08-190809 | 7/1996 |
| JP | 2003-217435 | 7/2003 |
| JP | 2005-166436 | 6/2005 |
| JP | 2013-037889 | 2/2013 |
| JP | 2014-235849 | 12/2014 |
| JP | 2018-097988 | 6/2018 |
| WO | 2013/021616 | 2/2013 |

* cited by examiner

OVERCURRENT CUTOFF UNIT

TECHNICAL FIELD

A technique disclosed in the present specification relates to an overcurrent cutoff unit.

BACKGROUND ART

A voltage detection module disclosed in JP2018-97988 A (Patent Document 1 described below) is known as a voltage detection module that can cut off an overcurrent.

This voltage detection module is provided with a bus bar that is connected to an electrode terminal of a battery cell, a relay terminal provided to a voltage detection conductor, and a mold resin member. The relay terminal includes a crimping portion that is crimped to the voltage detection conductor and a fusible portion having a small cross-section, and by the fuse portion being connected to the bus bar in the state where the fuse portion is embedded in the mold resin member, the bus bar and the voltage detection conductor are connected to each other via the relay terminal. When an overcurrent flows through the bus bar, the overcurrent is cut off between the bus bar and the voltage detection conductor due to fusing of the fuse portion.

CITATION LIST

Patent Document

Patent Document 1: JP2018-97988 A

SUMMARY OF INVENTION

Technical Problem

Incidentally, since a relay terminal including a crimping portion is typically formed by a copper alloy, in order to fuse the fuse portion of the relay terminal, it is necessary to form an ultra-fine fuse portion. Also, since the fuse portion embedded in the mold resin member has a heat transfer effect on the mold resin member in addition to the bus bar and a barrel, the fuse portion needs to be set long. Accordingly, in order to form an ultra-fine and long fuse portion in the relay terminal including the barrel, the number of manufacturing steps increase. Having said that, for example, if an overcurrent cutoff element is attached between the bus bar and the voltage detection conductor, the number of components increases.

The present specification discloses a technique for cutting off an overcurrent while suppressing an increase in the number of manufacturing steps and components.

Solution to Problem

A technique disclosed in the present specification is an overcurrent cutoff unit including a wire in which a conductive core wire is coated with an insulating coating, a terminal connection portion to be connected to a power source terminal, a core wire connection portion that is provided continuously with the terminal connection portion and connected to the core wire that is exposed from the coating at a terminal of the wire, and a coating holding portion that is provided side by side with the core wire connection portion in an extending direction of the wire, and holds the coating of the wire, in which the wire arranged between the core wire connection portion and the coating holding portion includes a fuse portion in which a diameter of the core wire is reduced in a state of being exposed from the coating.

According to this kind of overcurrent cutoff unit, when an overcurrent flows through the terminal connection portion, the overcurrent from the terminal connection portion can be cut off due to fusing of the fuse portion in which the diameter of the core wire is reduced. Also, since the fuse portion can be formed by removing the coating and a portion of the core wire of the wire arranged between the core wire connection portion and the coating holding portion, an increase in the number of manufacturing steps and the components can be suppressed.

The overcurrent cutoff unit disclosed in the present specification may also be configured as follows.

A configuration is also possible in which an entire circumference of an end portion of the coating that is adjacent to the fuse portion and the fuse portion are covered with a covering portion.

Since the strength decreases in the fuse portion formed by removing the coating and a portion of the core wire of the wire so as to have a small diameter, there is a concern that the fuse portion will break due to coming in contact with another component or the like. However, according to this kind of configuration, since the fuse portion is covered with the covering portion, it is possible to prevent other components from coming into contact with the fuse portion while preventing the fuse portion from breaking by reinforcing the fuse portion.

A configuration is also possible in which the covering portion has a cylindrical shape that is maintainable, and is fixed to the end portion of the coating that is adjacent to the fuse portion.

According to this kind of configuration, since the covering portion is fixed to the coating of the wire with its cylindrical shape being maintained, it is possible to prevent the covering portion from coming into contact with the fuse portion. In other words, an air layer is provided between the fuse portion and the covering portion, making it possible to prevent the fuse portion from failing to fuse due to heat transfer to the covering portion.

A configuration is also possible in which the core wire includes a plurality of conductive first element wires, and at least one or more second element wires that have a greater electrical resistance than the first element wires, and the fuse portion is formed by removing the coating and the plurality of first element wires of the wire.

According to this kind of configuration, since the fuse portion is formed by the second element wires that have a greater electric resistance than the first element wires, for example, compared to the case where the fuse portion is formed by the first element wires, the fuse portion can be fused even if the length is short. In other words, it is possible to suppress the case where the fuse portion becomes long and the overcurrent cutoff unit increases in size.

A configuration is also possible in which the first element wires are formed by copper or a copper alloy, and the second element wires are formed by steel.

Here, steel is an iron alloy including a minute amount of carbon and the like, and an example of steel includes stainless steel (SUS: Steel Use Stainless) including chrome, nickel, and the like.

According to this kind of configuration, it is possible to easily form the fuse portion by using a conventional high-strength wire in which an element wire made of the stainless steel is surrounded by a plurality of element wires made of copper or a copper alloy. In other words, it is possible to manufacture the overcurrent cutoff unit without newly manufacturing the wire.

Advantageous Effects of Invention

According to the technique disclosed in the present specification, an overcurrent can be cut off while suppressing an increase in the number of manufacturing steps and components.

DESCRIPTION OF EMBODIMENTS

First Embodiment

A first embodiment of the technique disclosed in the present specification will be described with reference to FIGS. 1 to 6.

The present embodiment illustrates a voltage detection unit 10 (an example of "overcurrent cutoff unit") that connects an electrode terminal (an example of "power source terminal") of a power storage device (not shown) and an ECU (Electronic Control Unit; not shown) that are mounted in a vehicle to each other.

Figure 1:
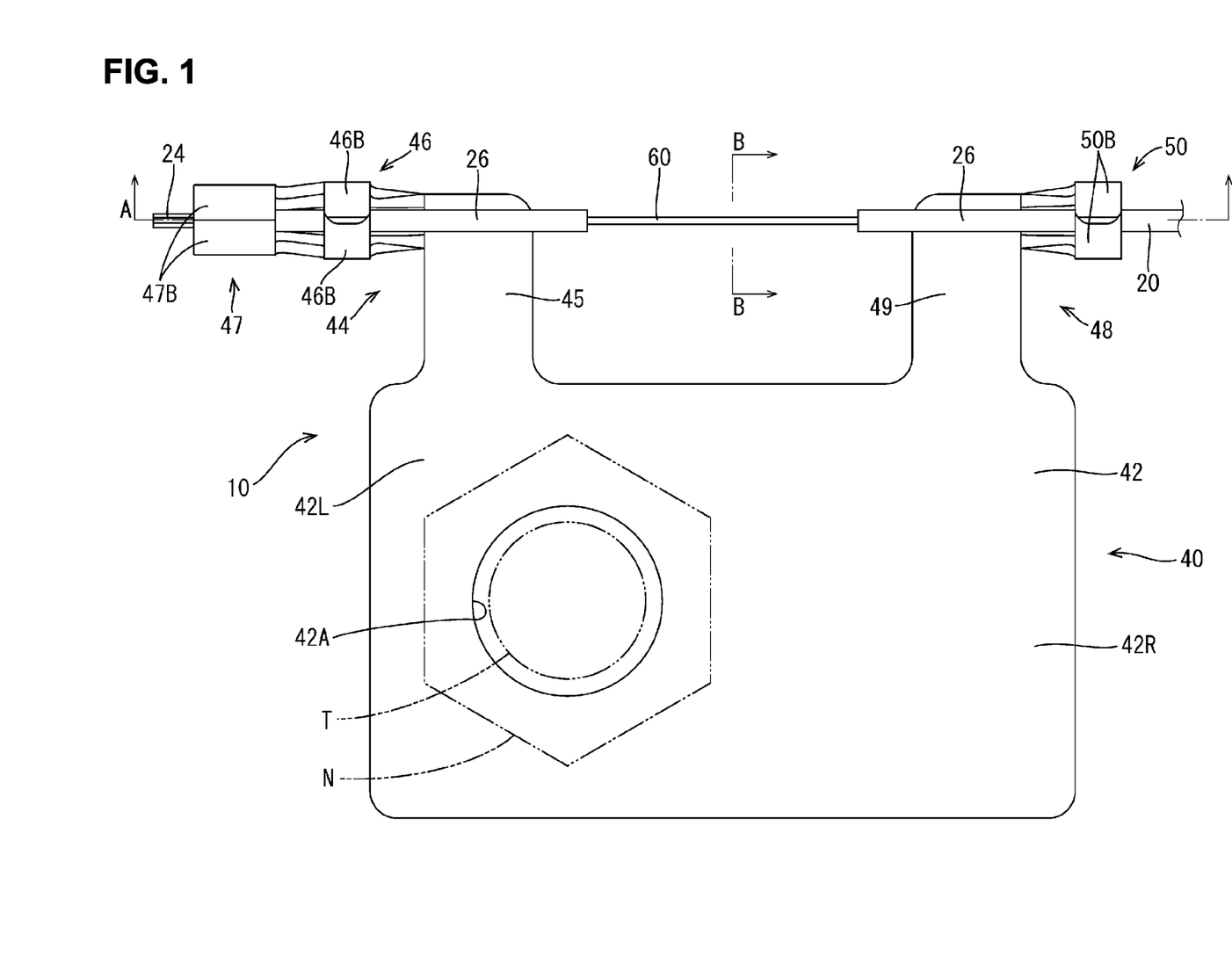
FIG. 1 is a plan view of a voltage detection unit according to a first embodiment.

As shown in FIG. 1, the voltage detection unit 10 is constituted to include a wire 20 connected to the ECU and a connection terminal 40 connected to a terminal of the wire 20.

The wire 20 is formed by a conductive core wire 24 and an insulating coating 26 that is insulative and coats the entirety of an outer circumferential surface of the core wire 24.

Figure 5:
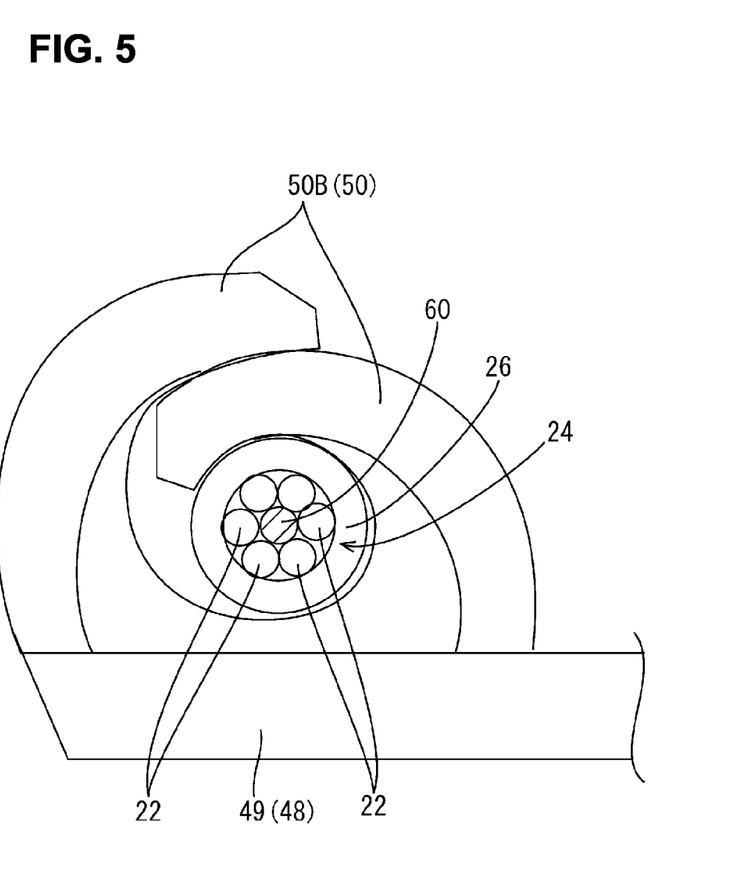
FIG. 5 is a cross-sectional view taken along line B-B in FIG. 1.

As shown in FIG. 5, the core wire 24 is constituted by a plurality of copper wires 22 (an example of "first element wire") formed by copper or a copper alloy surrounding at least one or more steel wires 21 (an example of "second element wire") formed by stainless steel. The stainless steel is an iron alloy including carbon chrome and nickel, and an example of the stainless steel includes SUS (Steel Use Stainless) that has an electrical resistance greater than copper and a copper alloy.

In the present embodiment, the core wire 24 is constituted by the entire circumference of one steel wire 21 being surrounded by six copper wires 22 having substantially the same diameter as the steel wire 21. In other words, the core wire 24 is formed such that the plurality of copper wires 22 are arranged around the one steel wire 21 having a greater electrical resistance than the copper wires 22. Note that the core wire 24 may also be configured such that the entire circumference of the one steel wire 21 are surrounded by seven or more of the copper wires 22 having a smaller diameter than the steel wire 21.

Figure 6:
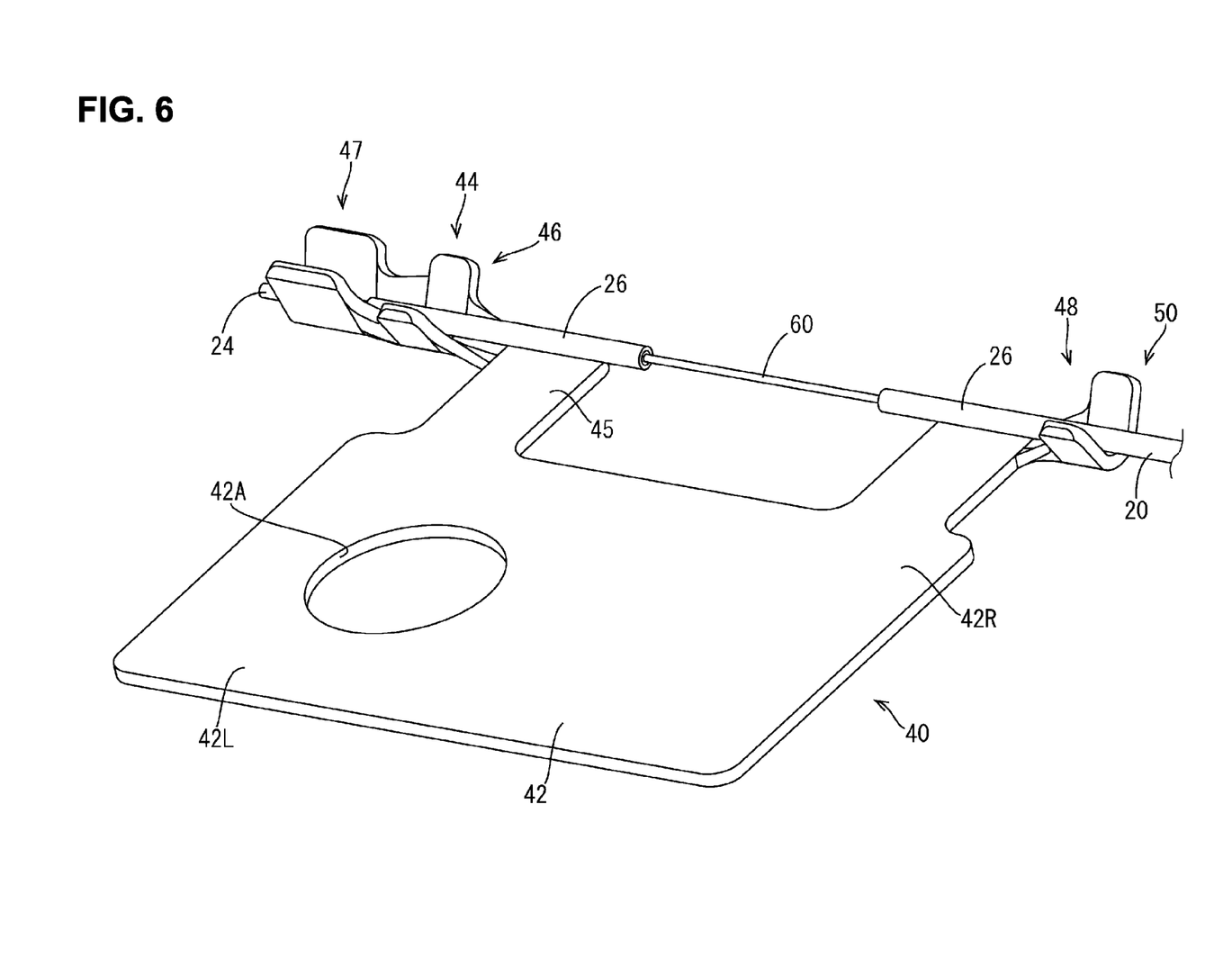
FIG. 6 is a perspective view showing a state where a wire is mounted on a connection terminal.
Figure 7:
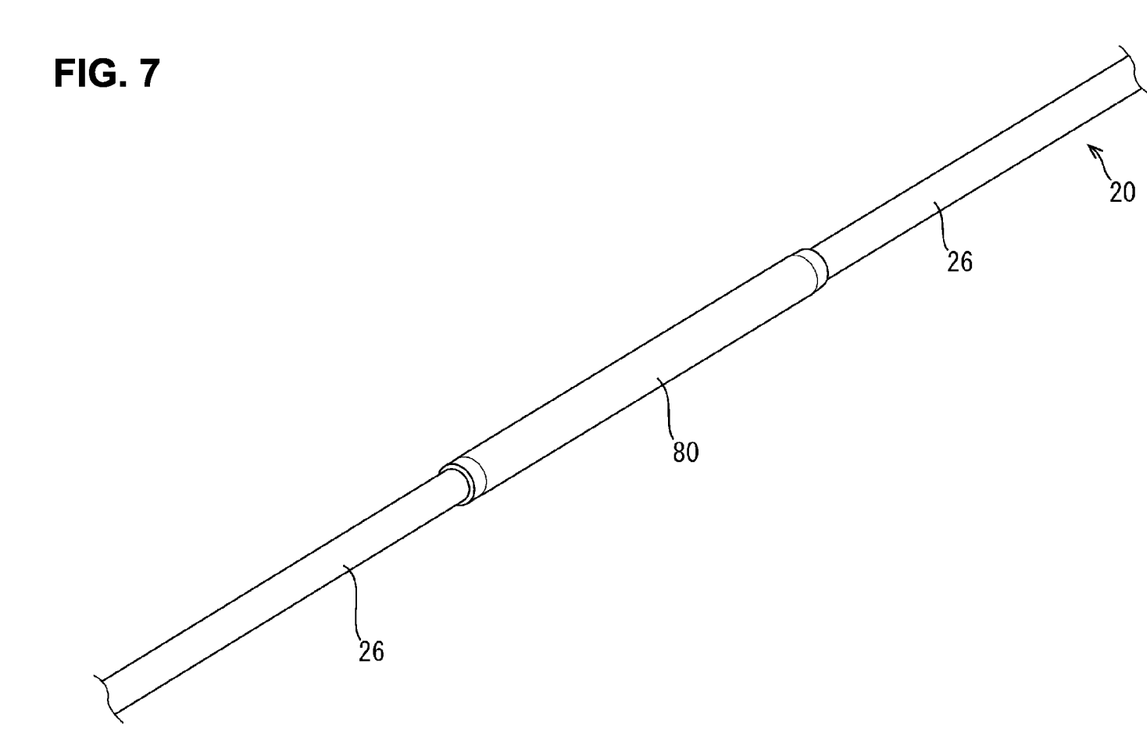
FIG. 7 is a perspective view showing a state where a fuse portion according to a second embodiment is covered with a sleeve.
Figure 8:
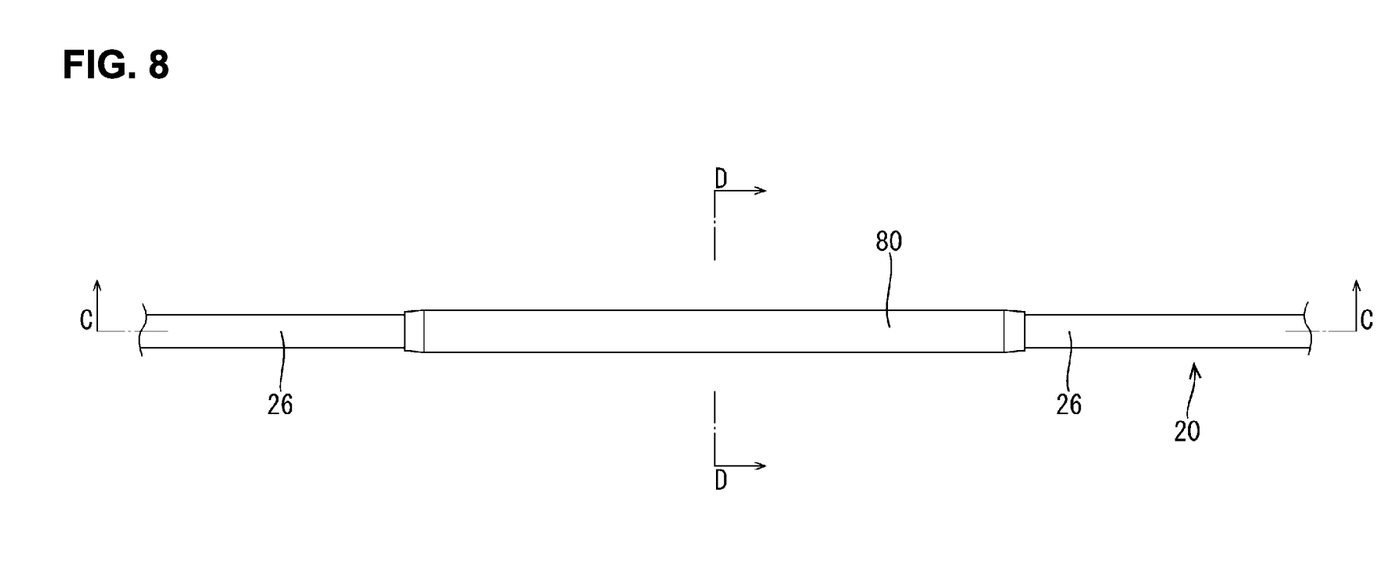
FIG. 8 is a plan view showing a state where a fuse portion is covered with a sleeve.

As shown in FIG. 1 and FIG. 6, the connection terminal 40 is constituted to include a terminal connection portion 42 shaped like an approximately rectangular flat plate, a connecting piece 44 extending rearward from the terminal connection portion 42, and a holding piece 48 extending rearward from the terminal connection portion 42.

The terminal connection portion 42 is shaped like an approximate rectangle that is elongated in the left-right direction, and has rounded corner portions. The terminal connection portion 42 includes a circular hole-like terminal insertion hole 42A that penetrates the terminal connection portion 42 in the thickness direction, and the terminal insertion hole 42A is provided biased on one side (left side in FIG. 1) of the terminal connection portion 42.

An electrode terminal T of the power storage device can be inserted into the terminal insertion hole 42A, and as shown in FIG. 1, the terminal connection portion 42 and the electrode terminal T are electrically connected to each other by fastening a nut N to the electrode terminal T that is inserted into the terminal insertion hole 42A.

The connecting piece 44 and the holding piece 48 are arranged side by side in the left-right direction at the rear side edge in the longitudinal direction of the terminal connection portion 42.

The connecting piece 44 is provided at a location slightly on the center side of one end portion 42L (end portion on the left side in FIG. 1) of the terminal connection portion 42.

The connecting piece 44 is constituted to include a first extending piece 45 that is continuous with the terminal connection portion 42, a first coating holding portion 46 provided at an end portion of the first extending piece 45, and a core wire connection portion 47 provided continuously with the first coating holding portion 46.

The first extending piece 45 is shaped like an approximate rectangular flat plate extending in the front-rear direction, and the first coating holding portion 46 is provided at the rear-side left edge portion of the first extending piece 45.

Figure 3:
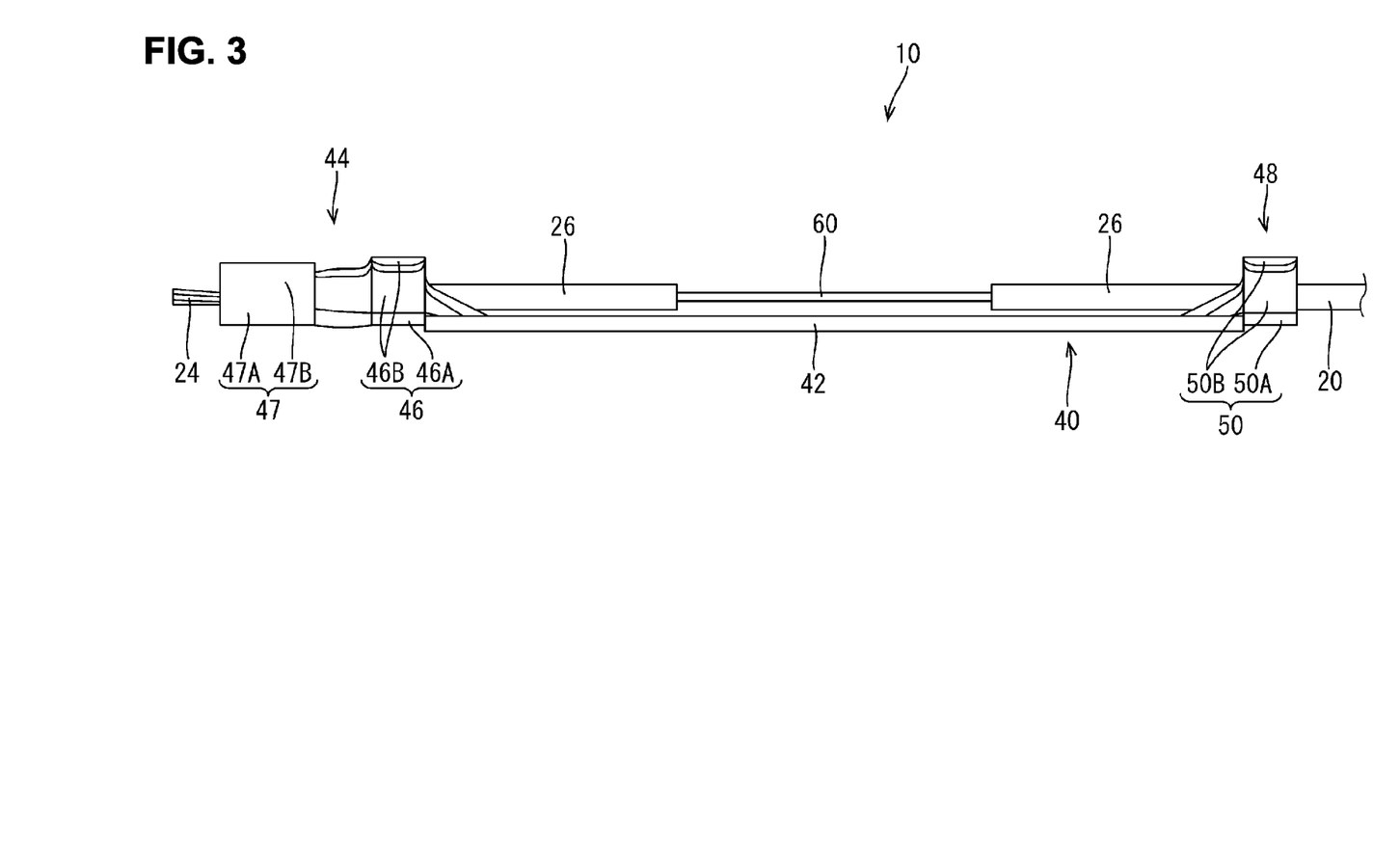
FIG. 3 is a side view of the voltage detection unit.
Figure 4:
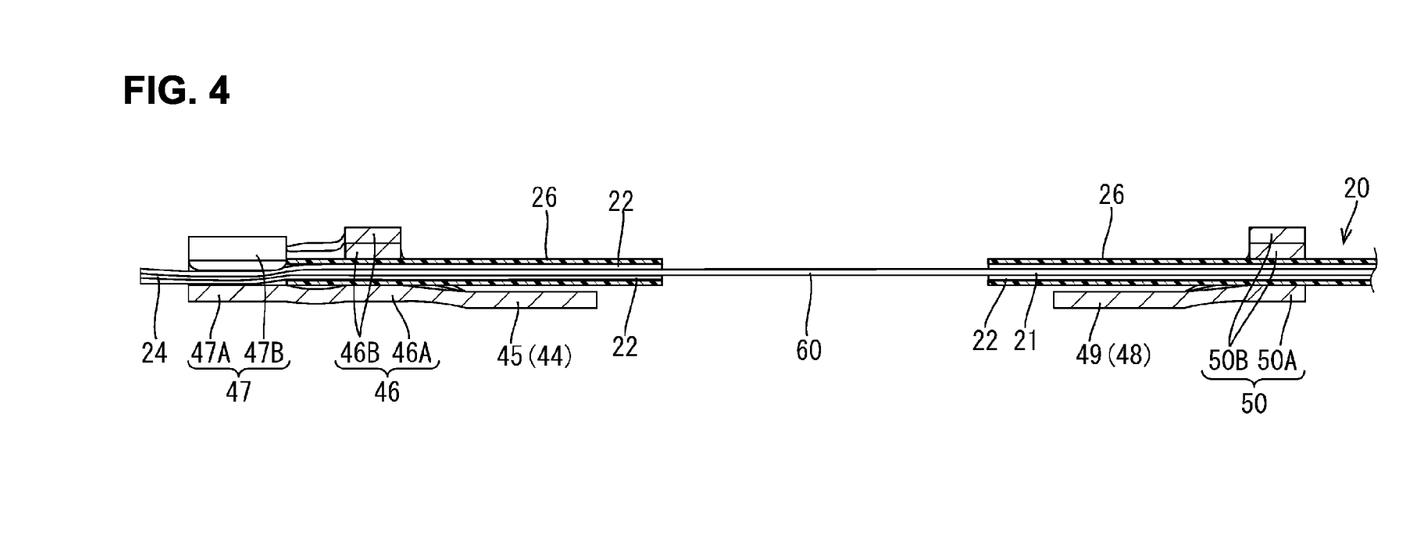
FIG. 4 is a cross-sectional view taken along line A-A in FIG. 1.

The first coating holding portion 46 includes a bottom plate 46A that is continuous with the first extending piece 45 and a pair of first barrel pieces 46B extending from both side edges in the front-rear direction of the bottom plate 46A. As shown in FIGS. 1, 3, and 4, the first coating holding portion 46 holds the terminal of the wire 20 by an insulating coating 26 of the terminal of the wire 20 being mounted on the bottom plate 46A, and the pair of first barrel pieces 46B being crimped to the insulating coating 26 so as to wrap around the insulating coating 26. Also, in the state where the first coating holding portion 46 is crimped to the insulating coating 26 of the wire 20, the wire 20 drawn out rightward from the first coating holding portion 46 is arranged on the rear end portion of the first extending piece 45.

Figure 2:
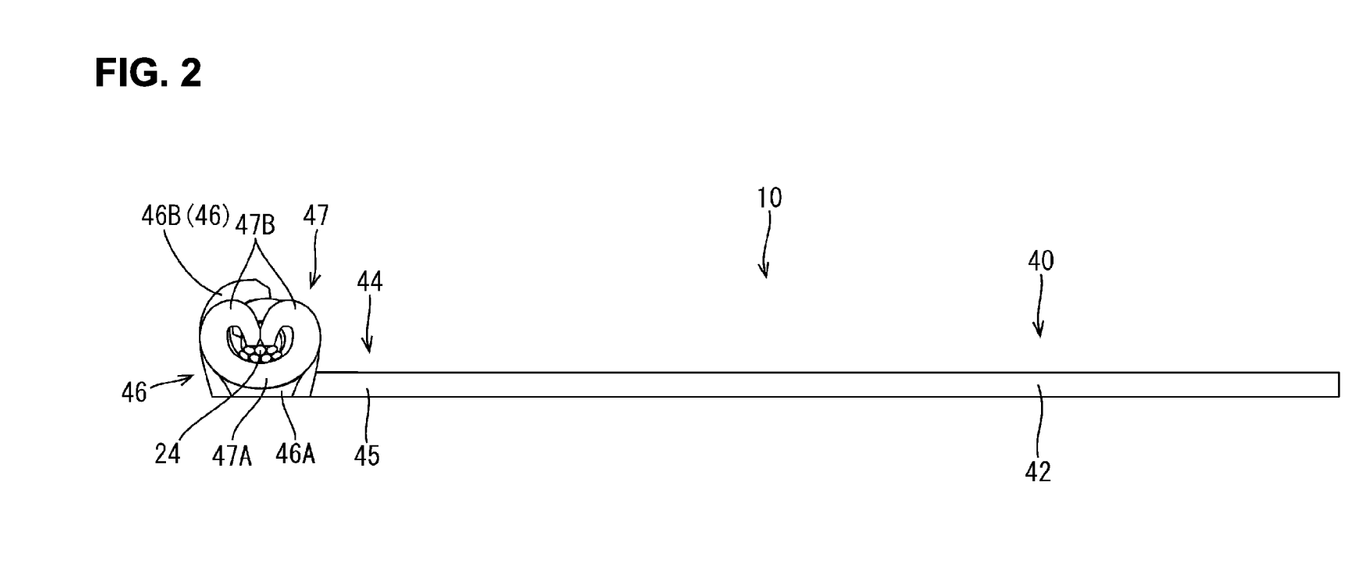
FIG. 2 is a front view of the voltage detection unit.

The core wire connection portion 47 includes a bottom plate 47A that is continuous with the bottom plate 46A of the first coating holding portion 46 and a pair of wire barrel pieces 47B extending from both side edges in the front-rear direction of the bottom plate 47A. As shown in FIGS. 2 and 4, the core wire connection portion 47 is crimped and fixed to the wire 20 by the insulating coating 26 being stripped, the core wire 24 exposed at the terminal of the wire 20 being mounted on the bottom plate 47A, and the pair of wire barrel pieces 47B being crimped to the core wire 24. In this manner, the connection terminal 40 and the wire 20 are electrically connected to each other.

On the other hand, the holding piece 48 is provided at a location slightly on the center side of another end portion 42R (end portion on the right side in FIG. 1) of the terminal connection portion 42. In other words, as shown in FIGS. 1 and 6, the holding piece 48 and the connecting piece 44 are arranged side by side with a predetermined interval therebetween in the left-right direction which is the extending direction of the wire 20 crimped to the connecting piece 44.

The holding piece 48 is constituted to include a second extending piece 49 that is continuous with the terminal connection portion 42, and a second coating holding portion 50 provided at the end portion of the second extending piece 49.

The second extending piece 49 is shaped like an approximately rectangular flat plate extending in the front-rear direction, and the second coating holding portion 50 is provided at the rear-side right edge portion of the second extending piece 49.

The second coating holding portion 50 includes a bottom plate 50A that is continuous with the second extending piece 49 and a pair of second barrel pieces 50B extending from both side edges in the front-rear direction of the bottom plate 50A. As shown in FIGS. 1, 3, and 4, the second coating holding portion 50 holds an intermediate position of the wire 20 by an insulating coating 26 at a intermediate portion spaced apart from the terminal of the wire 20 being mounted on the bottom plate 50A, and the pair of second barrel pieces 50B being crimped so as to wrap around the insulating coating 26 at the intermediate position. Also, in the state where the second coating holding portion 50 is crimped to the insulating coating 26 of the wire 20, the wire 20 drawn out leftward from the second coating holding portion 50 is arranged on the rear end portion of the second extending piece 49.

Here, as shown in FIG. 1, the wire 20 includes a fuse portion 60 between the core wire connection portion 47 of the connecting piece 44 and the second coating holding portion 50 of the holding piece 48.

The fuse portion 60 is provided between a position slightly on the holding piece 48 side of the first extending piece 45 of the connecting piece 44 and a position slightly on the connecting piece 44 side of the second extending piece 49 of the holding piece 48. Also, the fuse portion 60 is formed by reducing the diameter of the core wire 24 by stripping the insulating coating 26 of the wire 20 and removing the six copper wires 22 of the core wire 24 such that the one steel wire 21 remains.

In other words, the fuse portion 60 is formed by removing the insulating coating 26 and the copper wires 22 of the core wire 24 of the wire 20 such that only the steel wire 21 having the electric resistance greater than the copper wires 22 remains.

The present embodiment is configured as above, and next, the operations and effects of the voltage detection unit 10 will be described.

For example, in a voltage detection unit connected between a connection portion connected to a power source terminal of a power storage device and a wire of a detection device for detecting the voltage of the power source device, a method for cutting off an overcurrent by fusing a fusible portion provided in the connection portion when the overcurrent flows is known. However, in this kind of case, it is necessary to form an ultra-fine fuse portion. Also, in the case where the fuse portion is embedded in the mold resin member, it is necessary to set the fuse portion long in consideration of a heat transfer effect to the mold resin member with respect to the fuse portion. Having said that, for example, if an overcurrent cutoff element is attached as a substitute of the fuse portion, the number of components increases.

However, the voltage detection unit 10 of the present embodiment includes the wire 20 in which the conductive core wire 24 is coated with an insulating coating 26 that is insulative, the terminal connection portion 42 that is connected to the electrode terminal T, the core wire connection portion 47 of the connecting piece 44 that is provided continuously with the terminal connection portion 42 and connected to the core wire 24 that is exposed from the insulating coating 26 at the terminal of the wire 20, and the second coating holding portion 50 that is provided side by side with the core wire connection portion 47 in an extending direction of the wire 20 and holds the insulating coating 26 of the wire 20, and in the wire 20 arranged between the core wire connection portion 47 and the second coating holding portion 50 includes the fuse portion 60 in which the diameter of the core wire 24 is reduced in the state of being exposed from the insulating coating 26.

In other words, according to the present embodiment, when an overcurrent occurs at the electrode terminal T of the power storage device and the overcurrent flows through the connection terminal 40, the fuse portion 60 in which the diameter of the core wire 24 is reduced fuses, and thus the overcurrent can be cut off. In this manner, it is possible to prevent the overcurrent from flowing through the ECU from the connection terminal 40 via the wire 20. Also, according to the present embodiment, since it is possible to form the fuse portion 60 by removing the insulating coating 26 and a portion of the core wire 24 of the wire 20 arranged between the core wire connection portion 47 and the second coating holding portion 50, an increase in the number of manufacturing steps and components of the voltage detection unit 10 can be suppressed.

Also, according to the present embodiment, the core wire 24 includes the plurality of conductive copper wires 22 and the one or more steel wires 21 having an electrical resistance greater than the copper wires 22, and the fuse portion 60 is formed by only one steel wire 21 with the insulating coating 26 and the plurality of copper wires 22 of the wire 20 being removed.

That is, according to the present embodiment, since the fuse portion 60 is formed by the one steel wire 21 having an electrical resistance greater than the copper wires 22, compared to the case where the fuse portion is formed by copper wires, for example, it is possible to fuse the fuse portion 60 having a shorter length. In other words, it is possible to suppress the case where the fuse portion 60 becomes long and the voltage detection unit 10 increases in size.

Also, according to the present embodiment, it is possible to form the fuse portion 60 by the high-strength wire in which the steel wire 21 made of stainless steel is surrounded by the plurality of copper wires 22 made of copper or a copper alloy. In other words, since it is possible to manufacture the voltage detection unit 10 by using a high-strength wire that has been conventionally manufactured, without manufacturing a new wire, an increase in the manufacturing cost of the voltage detection unit 10 can be suppressed.

Second Embodiment

Next, a second embodiment will be described with reference to FIGS. 7 to 10. A fuse portion 60 of the second embodiment is formed by covering the outer circumference of the fuse portion 60 of the first embodiment with a sleeve 80 (an example of "covering portion"), and since the descriptions of configurations, operations, and effects that are in common with the first embodiment are redundant, such descriptions will be omitted. Furthermore, structures the same as the first embodiment will be given the same reference numerals.

The sleeve 80 of the second embodiment is made of a synthetic resin, and as shown in FIGS. 7 to 10, the sleeve 80 can maintain its approximate cylinder shape.

Figure 9:
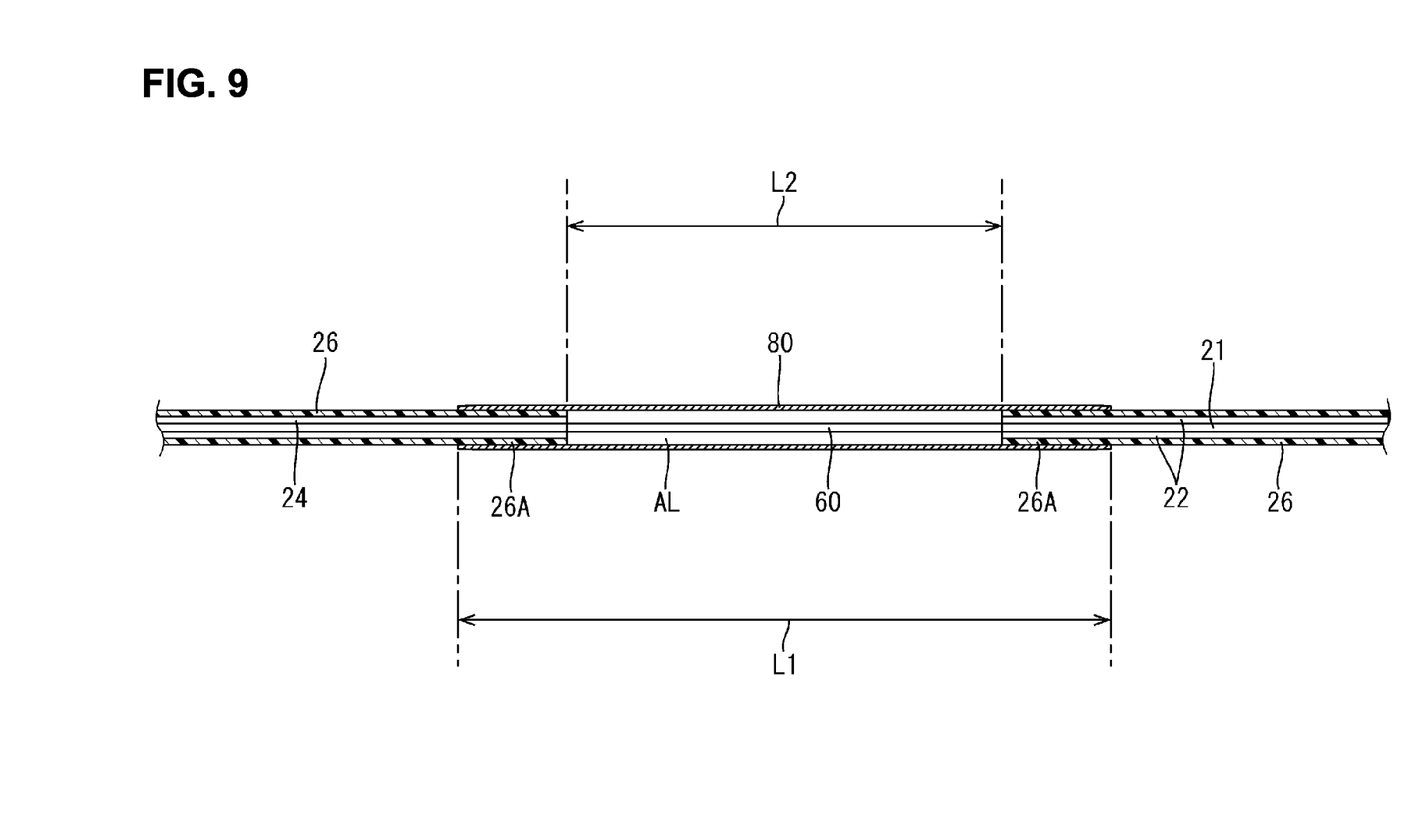
FIG. 9 is a cross-sectional view taken along line C-C in FIG. 8.

As shown in FIG. 9, a length dimension L1 in the left-right direction of the sleeve 80 is slightly longer in the left-right direction than a length dimension L2 in the left-right direction of the fuse portion 60. The inner diameter dimension of the sleeve 80 is set slightly greater than the outer shape dimension of the insulating coating 26 of the wire 20. Accordingly, the sleeve 80 can cover the entire circumference of the end portions 26A of the insulating coatings 26 and the fuse portion 60 that are adjacent on both the left and right sides of the fuse portion 60 with the wire 20 being inserted in the sleeve 80.

The sleeve 80 is fixed to the insulating coatings 26 of the wire 20 by an adhesive, or an adhering layer or a welding layer or the like provided on the inner surface of the sleeve 80, for example, in the state where the end portions 26A of the insulating coatings 26 on both the left and right sides of the fuse portion 60 and the fuse portion 60 are covered with the sleeve 80. That is, the fuse portion 60 is reinforced by the sleeve 80.

In other words, although the strength of the fuse portion 60 decreases due to being formed by removing the insulating coating 26 and a portion of the core wire 24 of the wire 20 so as to have a small diameter, the fuse portion 60 is reinforced by being covered with the sleeve 80, and thus it is possible to suppress breakage of the fuse portion 60 and suppress contact of other components with the fuse portion 60.

Figure 10:
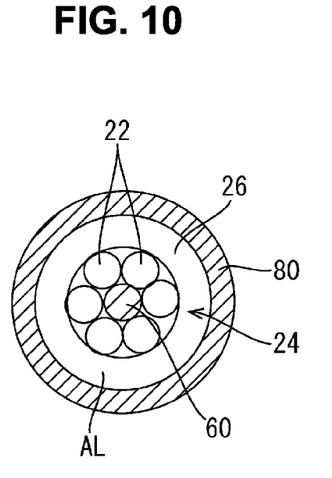
FIG. 10 is a cross-sectional view taken along line D-D in FIG. 8.

Also, according to the present embodiment, as shown in FIGS. 9 and 10, since an air layer AL is formed between the fuse portion 60 and the sleeve 80, it is possible to suppress failure of the fuse portion 60 to fuse due to heat transfer to the sleeve 80.

Note that it is also possible to further reinforce the sleeve 80 and, by extension, the fuse portion 60 by wrapping a resin tape or the like around the outer surface of the sleeve 80.

Third Embodiment

Next, a third embodiment will be described with reference to FIGS. 11 and 12.

In a wire 120 of the third embodiment, the core wire 24 of the wire 20 of the second embodiment is modified, and since the descriptions of the configurations, operations, and effects that are in common with the first embodiment are redundant, such descriptions will be omitted. Furthermore, the structures the same as the first embodiment will be given the same reference numerals.

Figure 11:
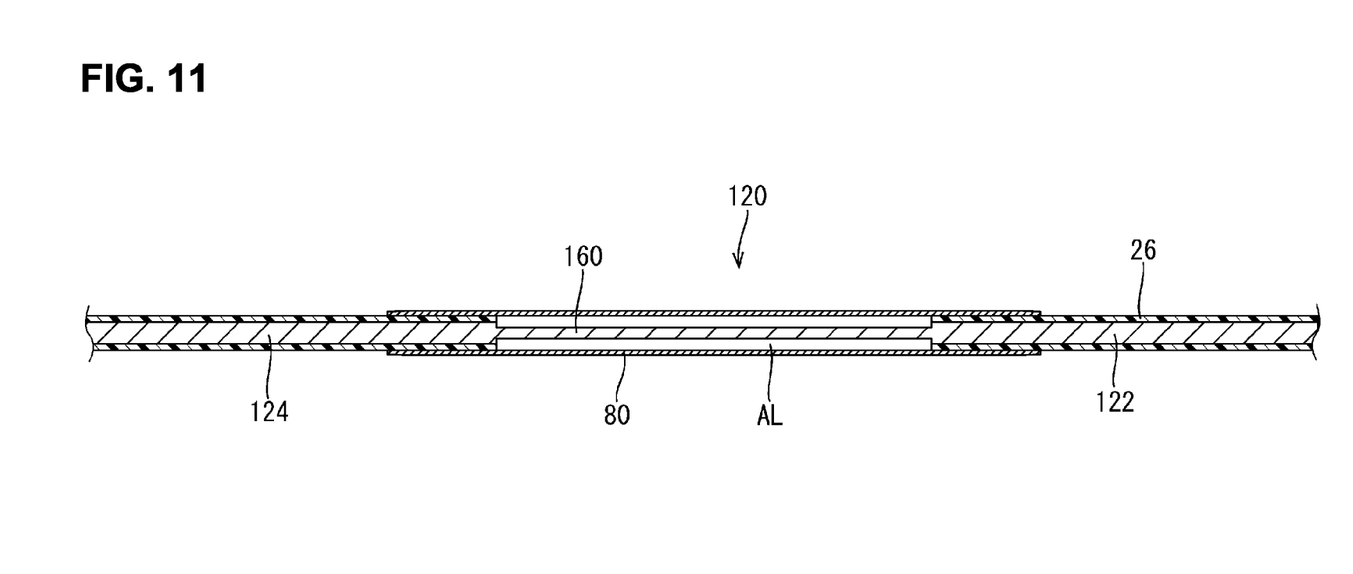
FIG. 11 is a cross-sectional view corresponding to a cross-section of FIG. 9 according to a third embodiment.
Figure 12:
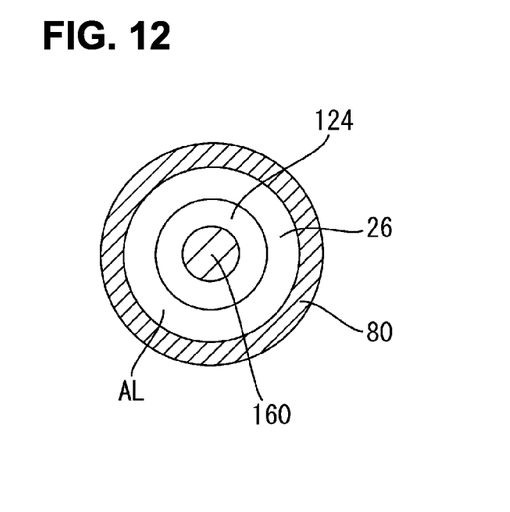
FIG. 12 is a cross-sectional view corresponding to a cross-section of FIG. 10.

As shown in FIG. 11 or 12, a core wire 124 of the wire 120 of the third embodiment is a single core wire 122 made of copper or a copper alloy. A fuse portion 160 is formed by stripping the insulating coating 26 of the wire 120 and reducing the diameter of the single core wire 122 by cutting work, for example.

As such, according to the present embodiment, since the ratio of the region of the single core wire 122 that is to be cut can be easily changed, it is possible to easily adjust the fusing time with respect to an overcurrent, the length of the fuse portion 160, and the like.

Other Embodiments

The technique disclosed in the present specification is not limited to the embodiments illustrated in the above description with reference to the drawings, and for example, various modes are also included as follows.

(1) In the above-described first and second embodiments, the core wire 24 is formed by the one steel wire 21 and the six copper wires 22. However, there is no limitation to this, and the core wire may also be formed by two or more steel wires and a plurality of copper wires.

(2) In the above-described first and second embodiments, the diameter of the steel wire 21 and the diameter of the copper wires 22 that constitute the core wire 24 are substantially the same. However, there is no limitation to this, and the diameter of the copper wires may also be smaller than the steel wire, or the diameter of the steel wire may also be smaller than the copper wires.

(3) In the above-described first and second embodiments, the core wire 24 is formed by the plurality of copper wires 22 and steel wires 21 of a number smaller than the copper wires 22. However, there is no limitation to this, and the core wire may also be formed by a plurality of copper wires and aluminum wires of a number smaller than the copper wires.

(4) In the above-described second and third embodiments, the fuse portion 60 is covered with the tubular sleeve 80. However, there is no limitation to this, and a configuration is also possible in which the fuse portion is covered with a sheet-like resin film by wrapping the resin film around the insulating coating 26.

LIST OF REFERENCE NUMERALS

10 Voltage detection unit (an example of "overcurrent cutoff unit")
20 Wire
21 Steel wire (an example of "second element wire")
22 Copper wire (an example of "first element wire")
24 Core wire
26 Insulating coating (an example of "coating")
42 Terminal connection portion
47 Core wire connection portion
50 Second coating holding portion (an example of "coating holding portion")
60 Fuse portion
80 Sleeve (an example of "covering portion")
T Electrode terminal (an example of "power source terminal")

The invention claimed is:
1. An overcurrent cutoff unit comprising:
a wire in which a conductive core wire is coated with an insulating coating;
a terminal connection portion configured to be connected to a power source terminal;
a core wire connection portion that is provided continuously with the terminal connection portion and con- nected to the core wire at a terminal of the wire where the core wire is exposed from the coating; and a coating holding portion that is provided side by side with the core wire connection portion in an extending direction of the wire, and holds the coating of the wire;

wherein the wire arranged between the core wire connection portion and the coating holding portion includes a fuse portion in which a diameter of the core wire is reduced and the core wire is exposed from the coating.

2. The overcurrent cutoff unit according to claim 1, wherein an entire circumference of an end portion of the coating that is adjacent to the fuse portion and the fuse portion are covered with a covering portion.

3. The overcurrent cutoff unit according to claim 2, wherein the covering portion has a cylindrical shape that is maintainable, and is fixed to the end portion of the coating that is adjacent to the fuse portion.

4. The overcurrent cutoff unit according to claim 1, wherein the core wire includes a plurality of conductive first element wires, and at least one or more second element wires that have a greater electrical resistance than the first element wires, and the fuse portion is formed by removing the coating and the plurality of first element wires of the wire.

5. The overcurrent cutoff unit according to claim 4, wherein the first element wires are formed by copper or a copper alloy, and the second element wires are formed by steel.

\* \* \* \* \*